United States Patent
Ahmed et al.

(10) Patent No.: US 10,445,812 B2
(45) Date of Patent: Oct. 15, 2019

(54) ATTRIBUTE EXTRACTION

(71) Applicant: BloomReach, Inc., Mountain View, CA (US)

(72) Inventors: Mohammad Salim Ahmed, Sunnyvale, CA (US); Antariksh Bothale, Mountain View, CA (US); Ailian Gan, Mountain View, CA (US); Warren Mar, San Francisco, CA (US); Ramkumar Rajendran, Campbell, CA (US); Sneha Venkatesh Yelimeli, Campbell, CA (US)

(73) Assignee: BloomReach, Inc., Mountain View, CA (US)

( * ) Notice: Subject to any disclaimer, the term of this patent is extended or adjusted under 35 U.S.C. 154(b) by 288 days.

(21) Appl. No.: 15/260,686

(22) Filed: Sep. 9, 2016

(65) Prior Publication Data

US 2018/0075511 A1    Mar. 15, 2018

(51) Int. Cl.
| | |
|---|---|
| *G06Q 30/00* | (2012.01) |
| *G06Q 30/06* | (2012.01) |
| *G06F 16/9535* | (2019.01) |
| *G06F 16/2457* | (2019.01) |
| *G06Q 30/02* | (2012.01) |
| *G06Q 90/00* | (2006.01) |

(52) U.S. Cl.
CPC ... *G06Q 30/0631* (2013.01); *G06F 16/24578* (2019.01); *G06F 16/9535* (2019.01); *G06Q 30/0201* (2013.01); *G06Q 90/00* (2013.01)

(58) Field of Classification Search
CPC .......... G06Q 30/0631; G06Q 30/0201; G06Q 90/00; G06Q 99/00; G06Q 2230/00; G06F 17/3053; G06F 17/30867; G06F 17/30

USPC ....... 705/26.7; 707/723, 766, 722, 740, 102, 707/E17.014, E17.089, E17.005
See application file for complete search history.

(56) References Cited

U.S. PATENT DOCUMENTS

| | | | |
|---|---|---|---|
| 7,689,527 | B2 | 3/2010 | Pavlov |
| 8,160,984 | B2 | 4/2012 | Hunt |
| 8,417,651 | B2 | 4/2013 | Kannan |
| 8,606,788 | B2 | 12/2013 | Chen |
| 8,700,494 | B2 | 4/2014 | Carlson |
| 8,700,652 | B2 | 4/2014 | Agarwal |

(Continued)

OTHER PUBLICATIONS 2015-246871, Apr. 2015, Derwent, Chang.*

(Continued)

*Primary Examiner* — Yogesh C Garg
(74) *Attorney, Agent, or Firm* — Moser Taboada (57) ABSTRACT

A system for extracting attributes can analyze text from data sources, extract n-grams from the text as candidate attribute and service/product pairs, prompt a human operator to rate the suitability of the candidate attribute and service/product pairs, and, based on the ratings, add the candidate attribute and service/product pairs to an attribute dictionary. In embodiments, an attribute extraction system includes an n-gram extractor, an attribute selector interface, and a dictionary builder. Data sources may include product titles, category descriptions, product descriptions, and like data from one or more product databases. In embodiments, the attribute dictionary is analyzed to determine canonical names for products or services and name variants for the products or services.

20 Claims, 4 Drawing Sheets

(56) References Cited

U.S. PATENT DOCUMENTS

| | | | |
|---|---|---|---|
| 8,732,198 B2 | 5/2014 | Chetuparambil | |
| 10,121,467 B1* | 11/2018 | Gandhe | G10L 15/197 |
| 10,162,865 B2* | 12/2018 | Yuen | G06F 17/30265 |
| 2008/0195659 A1* | 8/2008 | Rawle | G06Q 90/00 |
| 2008/0235271 A1 | 9/2008 | Wang | |
| 2009/0063546 A1 | 3/2009 | Sullivan | |
| 2012/0130940 A1 | 5/2012 | Gattani et al. | |
| 2012/0191717 A1 | 7/2012 | Chen | |
| 2012/0282704 A1 | 11/2012 | Li et al. | |
| 2012/0325881 A1 | 12/2012 | White | |
| 2013/0054419 A1 | 2/2013 | Yusko | |
| 2013/0282704 A1* | 10/2013 | Pantel | G06F 17/30867 707/723 |
| 2014/0143254 A1 | 5/2014 | Datta | |
| 2014/0188934 A1 | 7/2014 | Datta | |
| 2014/0201180 A1* | 7/2014 | Fatourechi | G06F 16/2453 707/706 |
| 2014/0324740 A1 | 10/2014 | Garera | |
| 2015/0052143 A1* | 2/2015 | Liu | G06F 17/30705 707/740 |
| 2015/0293910 A1* | 10/2015 | Mathur | G06F 17/2818 704/2 |
| 2016/0217522 A1* | 7/2016 | Jnagal | G06Q 30/0627 |
| 2017/0169103 A1* | 6/2017 | Juneja | G06F 17/30616 |
| 2017/0344224 A1* | 11/2017 | Kay | G06F 3/04817 |

OTHER PUBLICATIONS 2015-105642, Feb. 2015, Derwent, Pestian et al.*
International Search Report and Written Opinion dated Dec. 20, 2017 for Application No. PCT/US2017/050713, 7 pages.

* cited by examiner

ATTRIBUTE EXTRACTION

BACKGROUND

Providers of e-commerce web sites and other web pages typically desire to make web content accessible to as many potential consumers as possible. To that end, such providers commonly tag web pages with multiple, relevant labels that could potentially be used by general or e-commerce search engines used by consumers to find particular products, services, or to search for various attributes thereof. A common goal amongst search engines software systems is to provide thorough and relevant search results to search queries.

Potential shoppers on e-commerce web sites and software applications expect to receive relevant product and/or service results to search queries. Common search queries by potential shoppers may include descriptors of desired products and/or services. Such descriptors may include generic identifiers of the desired products and/or services, manufacturer and/or brand names, and product or service attributes. However, many search engines are unsuited for identifying the terms in a search query that constitute product and/or service attributes. Because languages can have multiple words with similar meaning, a concept can be described in a variety of ways, which may result in incongruities between what a searcher enters as a search query and what is returned from a search.

Due to many variations of product, service, and attribute terms, providers of e-commerce web sites may fail to include all potentially relevant labels that could lead consumers to view the web content. It may be desirable for said providers to be able to determine variations of products and/or service names by using computerized language processing.

It may also be desirable to be able to use computerized language processing to digest the content of e-commerce web pages to identify the product(s) and/or service(s) offered. Additionally, it may be desirable to be able to interpret attributes of the product(s) and/or service(s). It may also be desirable to be able to interpret search queries to identify products and/or services and attributes thereof that are contained in those queries in order to return relevant e-commerce pages.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for extracting attributes from text passages and building a dictionary of service/product attribute pairs. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein are adapted to extract, identify, and filter attributes and services or products from a variety of data sources. According to embodiments, said attributes may be added to a dictionary for subsequent language interpretation and/or generation of phrases having appropriate grammatical syntax. As used in the present disclosure, the term "attribute" means an adjective, an adverb, or other descriptive term(s) that, in some manner, set forth one or more qualities, features, traits, and/or characteristics of a service or product. In some cases, an attribute has a type and a value. For example, an attribute describing the material of an apparel item could be described as "material: cotton," where "material" is the attribute type and "cotton" is the value for that attribute type.

Figure 1:
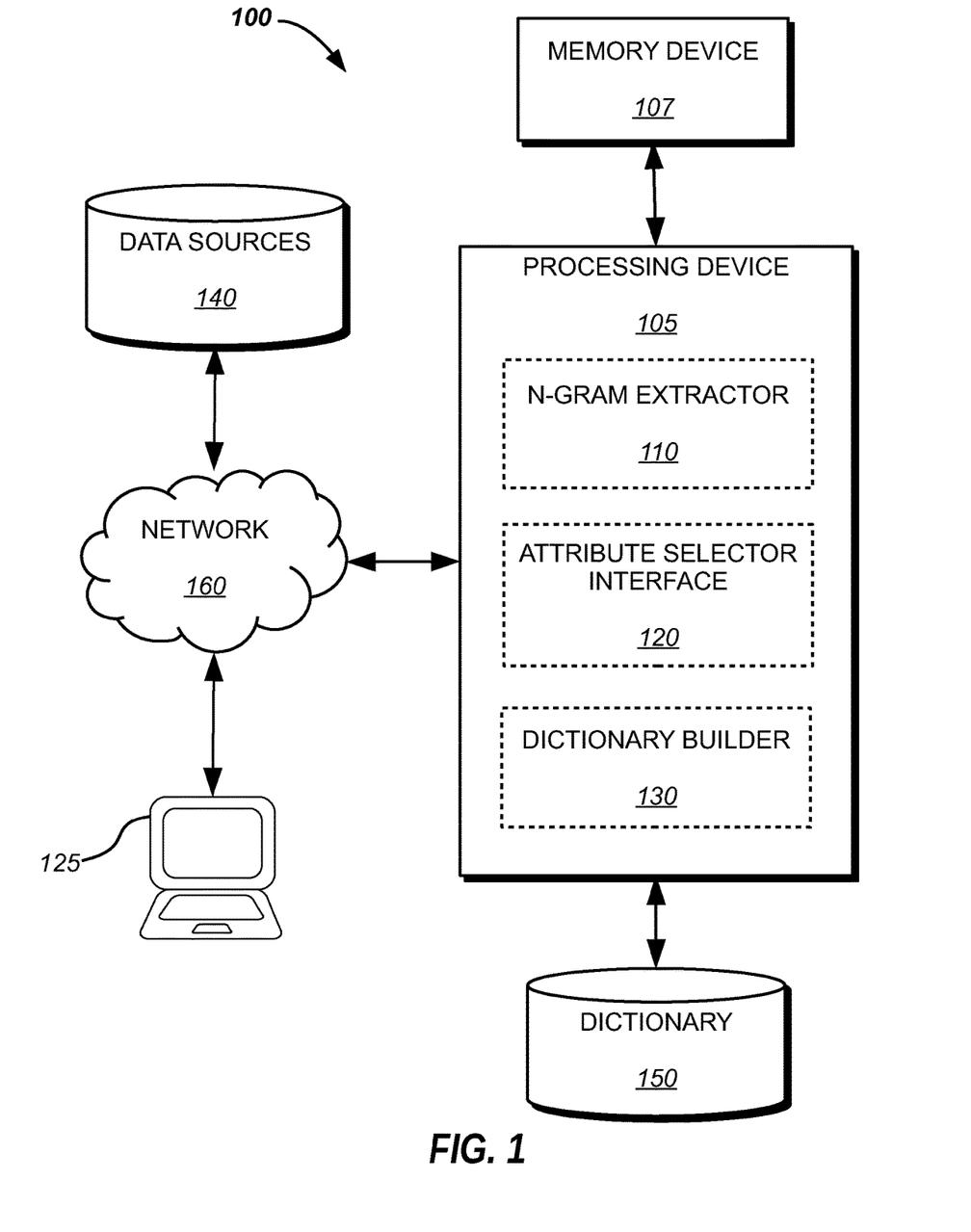
FIG. 1 is a block diagram illustrating an attribute extraction system according to one embodiment of the present disclosure.

FIG. 1 is a block diagram depicting an Attribute Extraction System 100 according to one embodiment of the present disclosure. In an embodiment, Attribute Extraction System 100 includes a processing device 105 and memory device 107. In one embodiment, memory device 107 has computer-readable instructions to direct processing device 105 to include an N-Gram Extractor 110, Attribute Selector Interface 120, and Dictionary Builder 130.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In one embodiment, N-Gram Extractor 110 is adapted to carry out analyses of texts obtained from data sources 140, identify n-grams in said data sources 140, and extract n-grams that constitute candidate attribute and service/product pairs from the data sources 140. In embodiments, extracted candidate attribute and service/product pairs may be transmitted to Attribute Selector Interface 120 for further selection as will be described below.

In various embodiments, data sources 140 include one or more collections of text and/or data describing products or services that may include attributes describing the products or services. In embodiments, data sources 140 include product titles, category descriptions, product descriptions, breadcrumbs, and like data from one or more product databases. In another embodiment, data sources 140 include information regarding services. In one embodiment, data sources 140 comprise user-generated textual content having natural language structure. Examples of such user-generated content include product reviews or answers to questions submitted by users. In some embodiments, data sources 140 include structured data including product feeds, third party dictionaries, and other like data sources. In some embodiments, data sources 140 include noncommercial text bodies. For example, in one embodiment, text from a publicly available knowledge base such as Wikipedia is analyzed for candidate attribute and service/product pairs. In one embodiment, n-grams that include context of candidate attribute and service/product pairs are extracted from knowledge base data sources to aid in further analysis.

In embodiments, N-Gram Extractor 110 is adapted to crawl data sources 140 and parse text from data sources 140 to identify n-grams that comprise candidate attribute and service/product pairs n-grams. In embodiments, n-grams may be collected in numerous varieties of sequence lengths. In another embodiment, n-grams may be limited to bigrams and larger n-grams. In another embodiment, n-grams may have an upper size limit. For example, in one embodiment, n-grams have at least two words but no more than five words. In other embodiments, n-grams having any number of words may be extracted.

In embodiments, N-Gram Extractor 110 is adapted to identify candidate attribute and service/product pairs as n-grams in data sources 140. Various criteria may be selected to determine if any particular n-gram qualifies as a candidate attribute and service/product pair. In one embodiment, candidate attribute and service/product pairs are identified in a product title in data sources 140 as terms having a particular distance from a left or right end of a phrase.

In one embodiment, candidate attribute and service/product pairs are identified by: first, finding nouns or other terms in the data sources 140 that may constitute product and/or service names; second, identifying corresponding adjectives or other terms in the data sources 140 that may constitute matching attributes for the nouns; and third, selecting the product or service name that has the highest quantity, out of all nouns on the page, of corresponding attributes. The selected product or service is deemed to be the service or product in the candidate attribute and service/product pair, while any corresponding attribute(s) can be identified to be the attribute(s) in the candidate attribute and service/product pair.

In various other embodiments, N-Gram Extractor 110 is programmed to identify and extract candidate attribute and service/product pairs from data sources 140 using other methods and/or heuristics as may be appropriate for the circumstances or according to preferred criteria for the candidate attribute and service/product pairs. In embodiments, such methods of identifying candidate attribute and service/product pairs may be formulated depending on the content and/or schema of data sources 140.

In some embodiments, high frequency n-grams in data sources 140 are identified as candidate attribute and service/product pairs. In one embodiment, a threshold for n-gram frequency comprises a frequency quantile for n-grams identified in the text body. For example, in one embodiment, n-grams in the top decile of n-gram frequency distribution may be extracted. In other embodiments, other distribution quantiles may be used as high frequency criteria. In one embodiment, N-Gram Extractor 110 is adapted to identify all n-grams according to n-gram criteria. All n-grams identified may then be sorted and counts of each distinct n-gram made. N-Gram Extractor 110 may then compare each n-gram count to the total quantity of n-grams identified in the text to assign an appropriate quantile to each n-gram. N-Gram Extractor 110 can be programmed to identify n-grams from one or more selected quantiles associated with desirable n-gram frequencies.

In some embodiments, n-grams found in sufficient absolute quantities may be determined to be high frequency n-grams. For example, N-Gram Extractor 110 can be programmed to only recognize a high frequency n-gram as one that appears at least ten times in the text. As another example, a high frequency n-gram is one that appears at least twenty times in the text. As another example, a high frequency n-gram is one that appears at least five times in the text. In various other embodiments, high frequency n-grams are identified by other selected quantity thresholds.

In one embodiment, N-Gram Extractor 110 is adapted to extract attributes from structured data sources. In embodiments, structured data sources include one or more data fields. Data fields may include product and/or service name, attribute data fields, and other information pertaining to the product or service.

In one embodiment, N-Gram Extractor 110 is adapted to identify candidate attribute and service/product pairs by comparing n-grams from the data sources 140 to dictionaries of words or phrases that have a relatively high likelihood of being an attribute. For example, N-Gram Extractor 110 may search one or more dictionaries of adjectives for words within n-grams. If any matches are identified, such n-grams may be flagged as a high-likelihood attribute and service/product pair and treated accordingly in subsequent processing.

In embodiments, candidate attribute and service/product pairs, as identified by N-Gram Extractor 110, may be transmitted to Attribute Selector Interface 120. According to embodiments, Attribute Selector Interface 120 is adapted to present each candidate attribute and service/product pair to a human operator to determine whether each candidate attribute and service/product pair comprises a suitable pair of a product or service and an attribute that describes the product or service. In one embodiment, an operator accesses Attribute Selector Interface 120 via a workstation 125 that is connected to Attribute Extraction System 100 via network 160. In other embodiments, an operator accesses Attribute Selector Interface 120 via one of various types of computer devices, including but not limited to mobile computing devices such as smartphones or tablets, personal computers such as laptop computers or desktop computers, and the like. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

According to various embodiments, Attribute Selector Interface 120 can transmit computer-readable instructions directing workstation 125 to generate a user interface by which the operator can input selections. In one embodiment, Attribute Selector Interface 120 presents candidate attribute and service/product pairs to the operator. The operator may select whether each candidate attribute and service/product pair includes an appropriate attribute for the service/product. In some embodiments, Attribute Selector Interface 120 is adapted to receive a rating from the operator for the attribute and service/product pair on a numerical scale according to the suitability of the attribute in describing the service/product. Such a rating may determine whether a candidate attribute and service/product pair qualifies as a sufficiently matched attribute and service/product pair.

In embodiments, Attribute Selector Interface 120 is adapted to receive inputs from workstation 125 for each candidate attribute and service/product pair. For those candidate attribute and service/product pairs that were determined to be suitable attribute and service/product pairs, Attribute Selector Interface 120 can transmit the same to Dictionary Builder 130 for further processing as will be set forth in further detail below. In one embodiment, a quality threshold may be implemented, by which the rating of each candidate attribute and service/product pair may be compared to determine if the pair is a suitable attribute and service/product pair. In other embodiments, additional metrics may be employed to determine if each candidate attribute and service/product pair is suitable.

In one embodiment, Attribute Selector Interface 120 may query the operator for additional information related to each candidate attribute and service/product pair. For example, Attribute Selector Interface 120 may query the operator to identify which component(s) of each pair constitute an attribute and which component(s) constitute a service or product. As another example, the operator may be provided a prompt to specify whether an attribute is a color, a physical dimension, a material type, or one of other various types of attributes. In another embodiment, the operator may be queried to input a synonym, plural, and/or hypernym of the attribute. In one embodiment, attributes are classified by the operator as objective or subjective attributes. According to various embodiments, additional information related to attributes may be transmitted to Dictionary Builder 130 for additional processing.

In embodiments, Dictionary Builder 130 comprises a processor and computer-readable instructions directing the processor to receive one or more attribute and service/product pairs from Attribute Selector Interface 120, wherein said attribute and service/product pairs were determined to be suitable by the operator. In one embodiment, Dictionary Builder 130 is adapted to add received service/product pairs to Dictionary 150. According to embodiments, virtually any number of attribute and service/product pairs may be added to Dictionary 150 by Dictionary Builder 130 as each pair is identified by N-Gram Extractor 110 and selected at Attribute Selector Interface 120.

In embodiments, Dictionary Builder 130 is adapted analyze attribute and service/product pairs that have been input for addition to Dictionary 150 to determine relationships between various attributes and/or service/products. In one embodiment, Dictionary Builder 130 can discover relationships between concepts by shared commonalities between the multiple attribute and service/product pairs under analysis. For example, by observing that a relatively high number of service/products are paired with the same attribute or set of attributes, Dictionary Builder 130 may determine that the various service/products are synonyms, hypernyms, and/or plurals of each other. Likewise, if multiple attributes are paired with the same service/products, Dictionary Builder 130 may determine that the various attributes are synonyms, hypernyms, and/or plurals of each other.

In some embodiments, Dictionary Builder 130 is programmed to generate additional attributes for Dictionary 150 that were not necessarily found in or extracted from data sources 140. In embodiments, Dictionary Builder 130 is provided with a group of tiered ontological relationships for various products or services. In one embodiment, the groups include nodes organized in a hierarchy of relationships. For example, related nodes may be "furniture>living room furniture>sofa." In another example, related nodes may be "apparel>tops>sweaters." In embodiments, these relationships may be curated automatically or manually. Dictionary builder 130 can construct a graph of such nodes.

Following entry of said ontological relationships, Dictionary Builder 130 can attach attribute types to the nodes. For example, the node "apparel" may be given the attribute type "material" and possible attribute values "cotton," "polyester," "linen," and the like. In one embodiment, children nodes inherit the attribute types of parent nodes; thus the nodes "tops" and "sweaters" are assigned the attribute type "material."

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
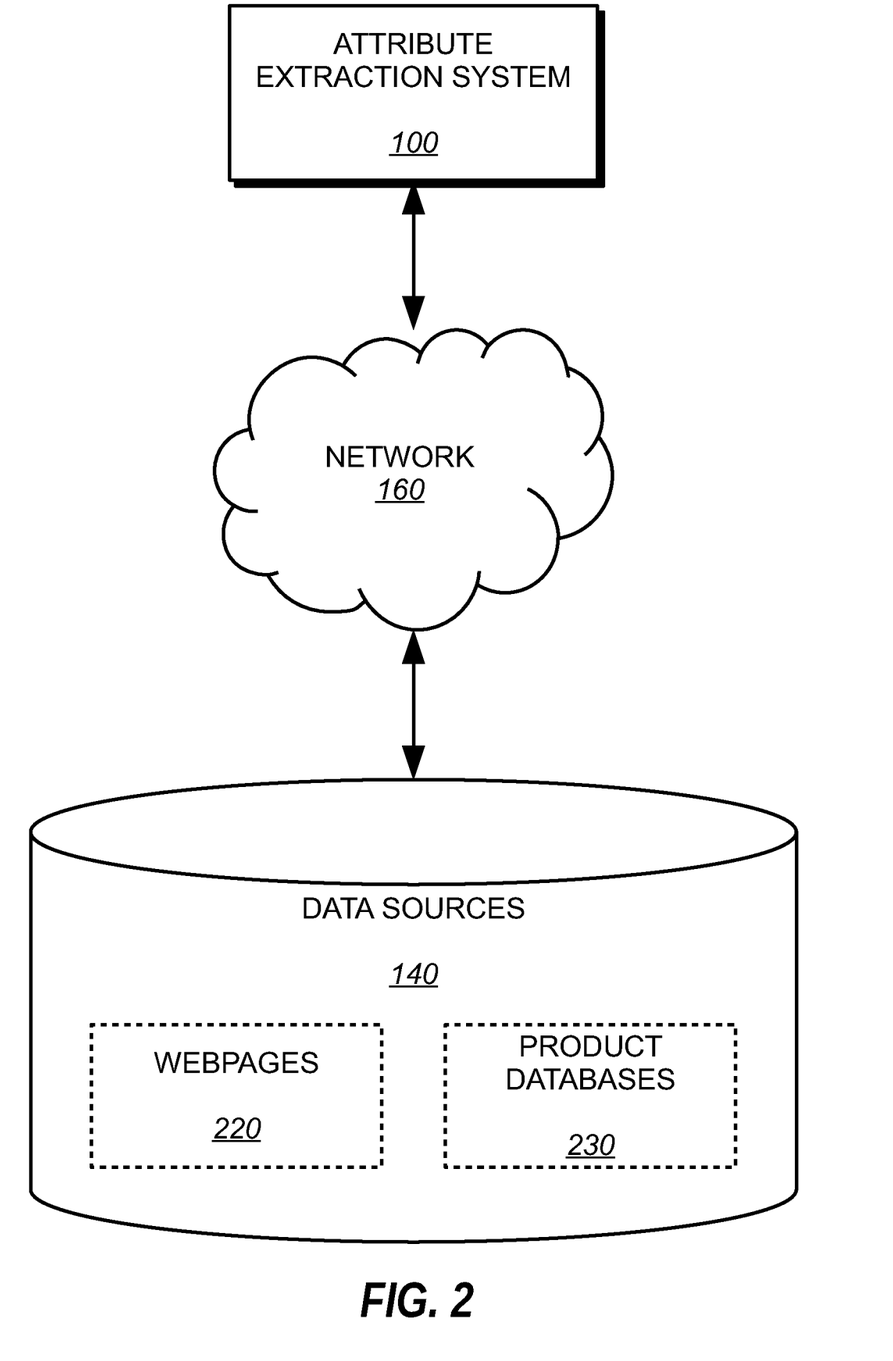
FIG. 2 is a schematic illustrating data sources according to one embodiment of the present disclosure.

FIG. 2 is an example schematic illustrating data sources 140 according to embodiments of the present disclosure. According to embodiments depicted in FIG. 2, data sources 140 include public-facing webpages 220 and internal product databases 230. In embodiments, data sources 140 include data from databases storing information regarding products or service that are offered by one or more providers. In embodiments, public-facing or other webpages are scraped for texts from which n-grams may be extracted. Text from data sources 140 can include product titles, category descriptions, and product descriptions that may be extracted as n-grams by N-Gram Extractor 110.

According to embodiments, N-Gram Extractor 110 is adapted to search text portions for n-grams. According to embodiments, N-Gram Extractor 110 may receive text obtained from data sources 140 via network 160. According to various embodiments of the present disclosure, data sources 140 may be found on a variety of local or remote servers. In one embodiment, data sources 140 include a structured database of products and/or services.

In operation, embodiments of the present disclosure may build a dictionary from various data sources for use in natural language processing tasks. According to embodiments, candidate attribute and service/product pairs are extracted from data sources as n-grams, assessed by a human operator for suitability, and, if found sufficiently suitable, added to the attribute dictionary.

Figure 3:
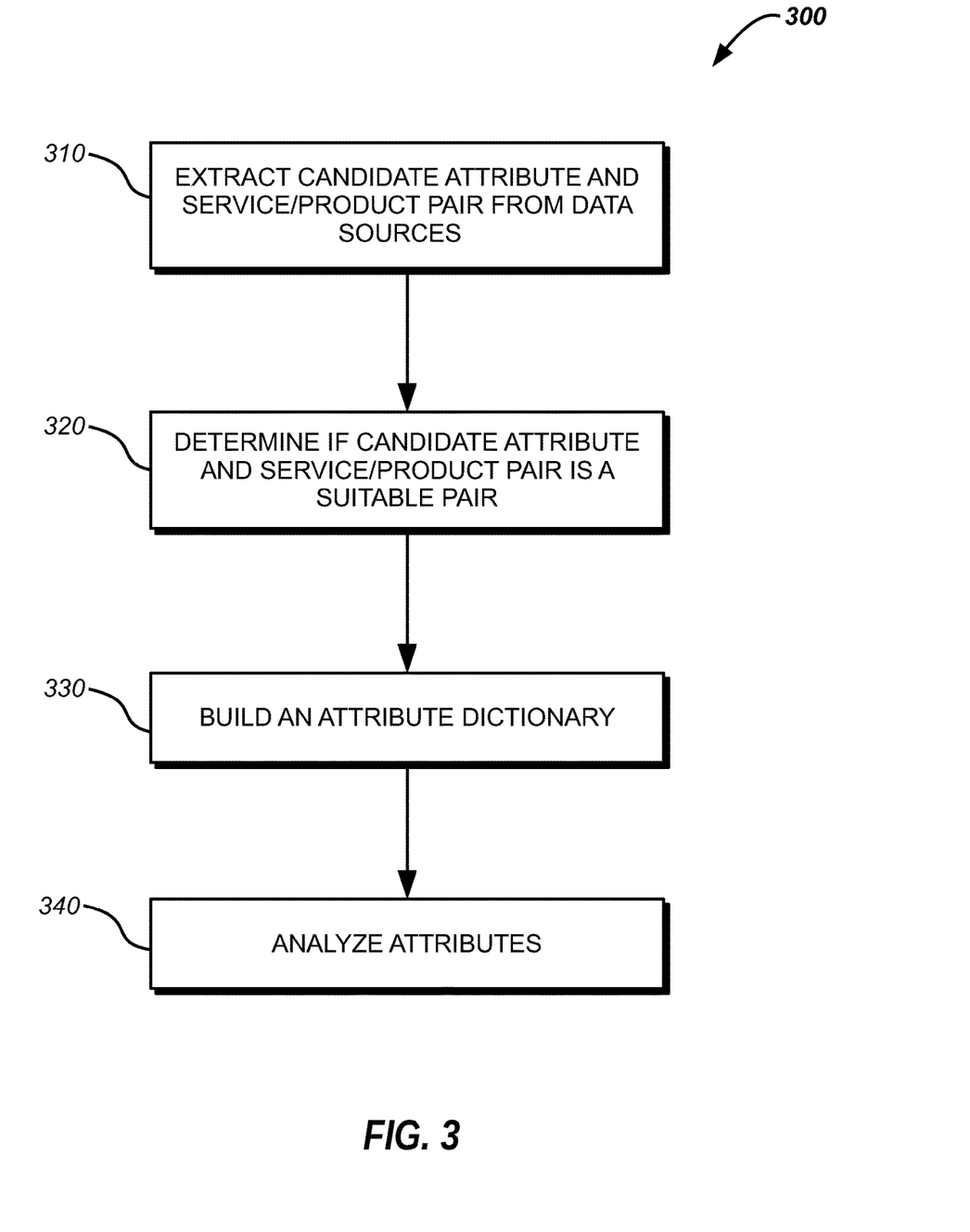
FIG. 3 is a block diagram illustrating an attribute extraction method according to one embodiment of the present disclosure.

Referring now to FIG. 3, method 300 for building an attribute dictionary is depicted. Method 300 begins at operation 310 EXTRACT CANDIDATE ATTRIBUTE AND SERVICE/PRODUCT PAIR FROM DATA SOURCES. According to embodiments, an n-gram extractor can parse text from a variety of data sources, including but not limited to: product/service titles, product/service classifications, product/service descriptions, and structured data sources including product feeds or third party dictionaries.

In one embodiment, at EXTRACT CANDIDATE ATTRIBUTE AND SERVICE/PRODUCT PAIR FROM DATA SOURCES 310, a candidate attribute and service/product pair comprises an n-gram that is found in data sources and includes a product or service and a corresponding attribute. In one embodiment, a candidate attribute and service/product pair is a high frequency n-gram in the data source. For example, in one embodiment, identified n-grams are ranked in order of frequency. High frequency n-grams may be selected as the top-ranking n-grams.

In various embodiments, at EXTRACT CANDIDATE ATTRIBUTE AND SERVICE/PRODUCT PAIR FROM DATA SOURCES 310, an n-gram constitutes virtually any number of words. In some cases, it may be desirable to limit the number of words in an n-gram; in such cases only n-grams having a quantity of words under a prescribed limit may be identified.

In various embodiments, at EXTRACT CANDIDATE ATTRIBUTE AND SERVICE/PRODUCT PAIR FROM DATA SOURCES 310, one or more data sources comprise structured data, which may include data fields for a product or service, attributes, and/or additional metadata. In such cases, EXTRACT CANDIDATE ATTRIBUTE AND SERVICE/PRODUCT PAIR FROM DATA SOURCES 310 comprises extracting the product or service and corresponding attribute(s) as an attribute and service/product pair.

Following EXTRACT CANDIDATE ATTRIBUTE AND SERVICE/PRODUCT PAIR FROM DATA SOURCES 310, process 300 proceeds to operation 320 DETERMINE IF CANDIDATE ATTRIBUTE AND SERVICE/PRODUCT PAIR IS A SUITABLE PAIR. According to embodiments, an attribute selector interface may be presented to a human operator, who may then be prompted to select whether a given n-gram comprises a suitable pairing of an attribute and a corresponding product or service. According to embodiments, at DETERMINE IF CANDIDATE ATTRIBUTE AND SERVICE/PRODUCT PAIR IS A SUITABLE PAIR 320, the human operators are requested to use inborn natural language processing skills to make determinations of suitability of each candidate attribute and service/product pair.

In various embodiments, at DETERMINE IF CANDIDATE ATTRIBUTE AND SERVICE/PRODUCT PAIR IS A SUITABLE PAIR 320, candidate attribute and service/product pairs that have previously been extracted from various data sources are displayed in sequence via a workstation to a human operator. In one embodiment, at DETERMINE IF CANDIDATE ATTRIBUTE AND SERVICE/PRODUCT PAIR IS A SUITABLE PAIR 320, as each candidate attribute and service/product pair is displayed, the human operator is prompted to input whether the candidate attribute and service/product pair includes such a suitable pair. In one embodiment, at DETERMINE IF CANDIDATE ATTRIBUTE AND SERVICE/PRODUCT PAIR IS A SUITABLE PAIR 320, as each candidate attribute and service/product pair is displayed, the human operator is prompted to input a rating that corresponds to the suitability of the attribute and service/product pair.

In various embodiments, at DETERMINE IF CANDIDATE ATTRIBUTE AND SERVICE/PRODUCT PAIR IS A SUITABLE PAIR 320, a human operator can review the displayed candidate attribute and service/product pair and ascertain whether the candidate attribute and service/product pair includes a product or service name and an attribute that could be used to describe such a product or service.

In some cases, at DETERMINE IF CANDIDATE ATTRIBUTE AND SERVICE/PRODUCT PAIR IS A SUITABLE PAIR 320, the human operator may recognize that the candidate attribute and service/product pair includes both an attribute and a service or product, yet the human operator may recognize that the attribute does not suit the service or product. For example, a candidate attribute and service/product pair containing the text "DENIM POPSICLE" may be determined by the human operator to not be suitable because the attribute "DENIM" is a nonsensical descriptor for the product "POPSICLE." As another example, a candidate attribute and service/product pair containing the text "DENIM JACKET" may be determined by the human operator to be suitable because the attribute "DENIM" may reasonably describe the product "JACKET."

In various embodiments, at DETERMINE IF CANDIDATE ATTRIBUTE AND SERVICE/PRODUCT PAIR IS A SUITABLE PAIR 320, a human operator is prompted to input a response as a numerical score corresponding to the operator's opinion of the suitability of the presented candidate attribute and service/product pair. For example, the operator may be prompted to determine, on a scale from 1 to 10, how suitable the candidate attribute and service/product pair is. As another example, the operator may be prompted to determine, on a scale from 1 to 5, how suitable the candidate attribute and service/product pair is.

In other embodiments, at DETERMINE IF CANDIDATE ATTRIBUTE AND SERVICE/PRODUCT PAIR IS A SUITABLE PAIR 320, a human operator is prompted to input a response as dichotomous rating. In other words, the operator's response may be either "Yes" or "No" depending on whether the operator finds the candidate attribute and service/product pair sufficiently suitable.

In various embodiments, at DETERMINE IF CANDIDATE ATTRIBUTE AND SERVICE/PRODUCT PAIR IS A SUITABLE PAIR 320, a human operator can input a selection that the operator is not certain of the suitability of the candidate attribute and service/product pair. In such cases, the candidate attribute and service/product pair may be displayed to one or more other human operators to request input in order to determine if a consensus can be reached regarding the suitability of the candidate attribute and service/product pair. In other embodiments, such uncertain candidate attribute and service/product pairs may be presumed to not constitute an attribute and service/product pair.

Following DETERMINE IF CANDIDATE ATTRIBUTE AND SERVICE/PRODUCT PAIR IS A SUITABLE PAIR 320, process 300 proceeds to operation 330 BUILD AN ATTRIBUTE DICTIONARY. According to embodiments, a dictionary builder can receive candidate attribute and service/product pairs that were determined at DETERMINE IF CANDIDATE ATTRIBUTE AND SERVICE/PRODUCT PAIR IS A SUITABLE PAIR 320 to constitute a suitable attribute and service/product pair.

In various embodiments, at BUILD AN ATTRIBUTE DICTIONARY 330, the dictionary builder may add each suitable attribute and service/product pair to the attribute dictionary. In various embodiments, at BUILD AN ATTRIBUTE DICTIONARY 330, the dictionary builder is adapted to continue to augment the attribute dictionary by adding each suitable attribute and service/product pair as each pair is received.

In various embodiments, at BUILD AN ATTRIBUTE DICTIONARY 330, the dictionary builder can compare a received attribute and service/product pair to pairs already stored in the attribute dictionary to determine if the received attribute and service/product pair is a duplicate. Embodiments of BUILD AN ATTRIBUTE DICTIONARY 330 comprises dictionary entry deduplication.

In various embodiments of BUILD AN ATTRIBUTE DICTIONARY 330, the dictionary builder can store metadata relating to each received attribute and service/product pair. Said metadata may include metadata relating to the frequency of the attribute and service/product pair in various data sources, rankings of each attribute and service/product pair from human operators, metadata relating to the data source(s) from which the attribute and service/product pair was extracted, and any additional metadata that may be relevant to further processing of each attribute and service/product pair.

Following BUILD AN ATTRIBUTE DICTIONARY 330, process 300 proceeds to operation 340 ANALYZE ATTRIBUTES. According to embodiments, attributes and/or service/products stored at BUILD AN ATTRIBUTE DICTIONARY 330 are analyzed to determine relationships between various attributes and/or service/product pair.

In various embodiments, at ANALYZE ATTRIBUTES 340, the attributes, services, and/or products stored in the attribute dictionary are analyzed to determine a canonical name for each attribute, service, and/or product. According to embodiments, at ANALYZE ATTRIBUTES 340, aliases of said canonical names for products and/or services may be ascertained. According to embodiments, at ANALYZE ATTRIBUTES 340, localized spellings or other types of variants of said canonical names for products and/or services may be ascertained.

According to some embodiments, at ANALYZE ATTRIBUTES 340, context from data sources are analyzed to gain additional insight regarding the attribute, product, and/or service. In various embodiments, at ANALYZE ATTRIBUTES 340, the attributes, services, and/or products stored in the attribute dictionary are analyzed to determine if they are synonyms, hypernyms, and/or plurals of other corresponding attributes, services, and/or products stored in the attribute dictionary. In one embodiment, the cooccurrence of certain attributes with the same or similar products and/or services may indicate that the attributes are synonyms, hypernyms, and/or plurals of each other. In one embodiment, terms that consistently have the same or similar context in texts of various data sources may be ascertained to constitute synonyms, hypernyms, and/or plurals of each other. In some embodiments, stem variants of terms may be identified by comparing and analyzing the respective context of various n-grams in the data sources.

Figure 4:
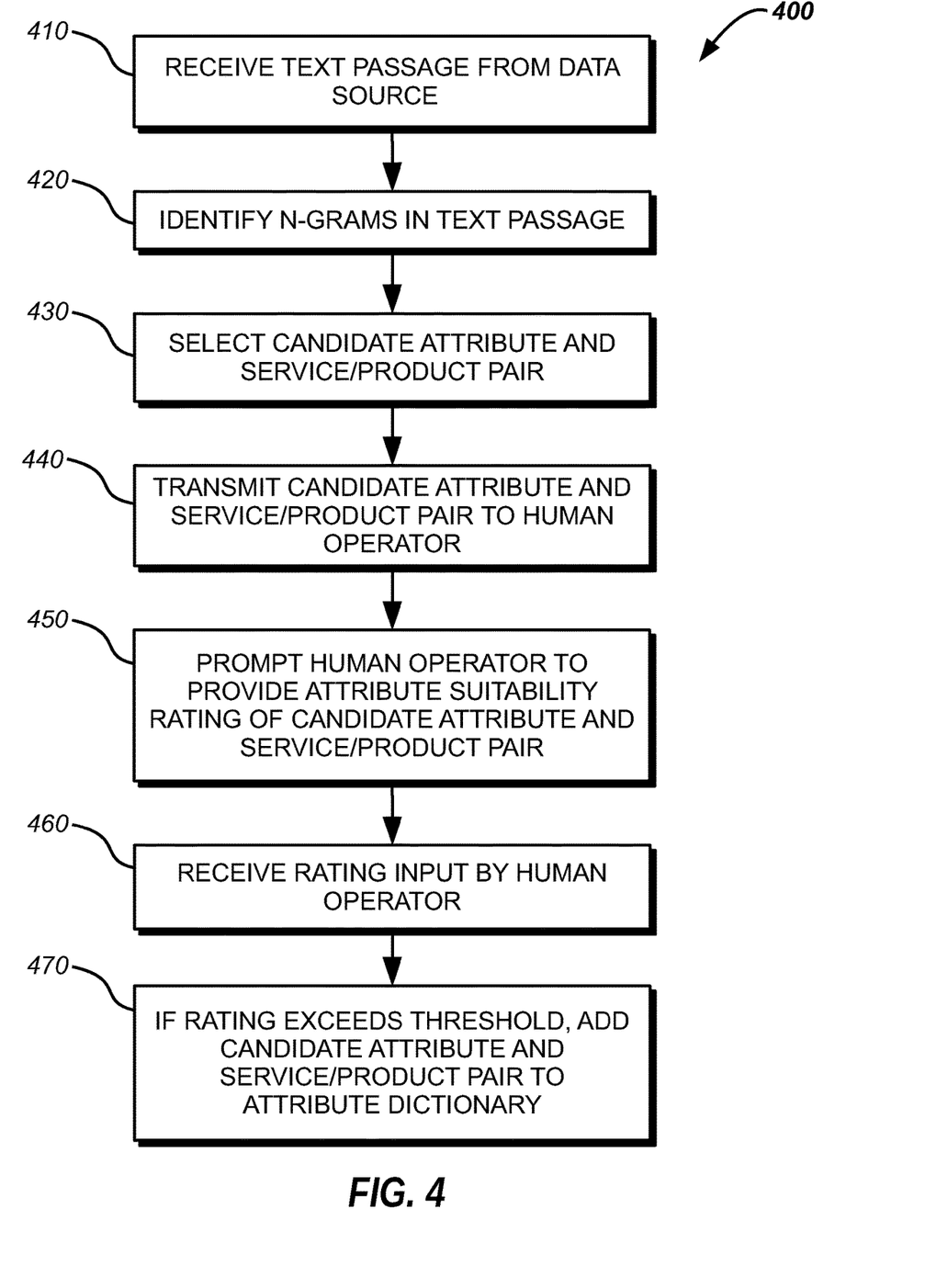
FIG. 4 is a block diagram illustrating an attribute extraction method according to another embodiment of the present disclosure.

Referring now to FIG. 4, method 400 for building an attribute dictionary is depicted. Method 400 begins at operation 410 RECEIVE TEXT PASSAGE FROM DATA SOURCE. According to embodiments, text passages may be retrieved from a variety of data sources, including but not limited to: product/service titles, product/service classifications, product/service descriptions, structured data sources including product feeds or third party dictionaries, other publicly-available texts including, but not limited to, crowd-sourced text.

Following RECEIVE TEXT PASSAGE FROM DATA SOURCE 410, process 400 proceeds to operation 420 IDENTIFY N-GRAMS IN TEXT PASSAGE. According to embodiments, n-grams may be one or more contiguous words in the text passage.

Following IDENTIFY N-GRAMS IN TEXT PASSAGE 420, process 400 proceeds to operation 430 SELECT CANDIDATE ATTRIBUTE AND SERVICE/PRODUCT PAIR. According to embodiments, a candidate attribute and service/product pair constitutes an n-gram that is found in a data source that may include an attribute and a corresponding service or product. In one embodiment, a candidate attribute and service/product pair is a high frequency n-gram.

Following SELECT CANDIDATE ATTRIBUTE AND SERVICE/PRODUCT PAIR 430, process 400 proceeds to operation 440 TRANSMIT CANDIDATE ATTRIBUTE AND SERVICE/PRODUCT PAIR TO HUMAN OPERATOR. According to embodiments, the candidate attribute and service/product pair may be presented to a human operator via an attribute selector interface.

Following TRANSMIT CANDIDATE ATTRIBUTE AND SERVICE/PRODUCT PAIR TO HUMAN OPERATOR 440, process 400 proceeds to operation 450 PROMPT HUMAN OPERATOR TO PROVIDE ATTRIBUTE SUITABILITY RATING OF CANDIDATE ATTRIBUTE AND SERVICE/PRODUCT PAIR. According to embodiments, the human operator may be prompted to select whether the given n-gram comprises a suitable pairing of an attribute and a corresponding product or service.

Following PROMPT HUMAN OPERATOR TO PROVIDE ATTRIBUTE SUITABILITY RATING OF CANDIDATE ATTRIBUTE AND SERVICE/PRODUCT PAIR 450, process 400 proceeds to operation 460 RECEIVE RATING INPUT BY HUMAN OPERATOR. According to embodiments, the human operator inputs an attribute suitability rating via the attribute selector interface, the rating indicating the suitability of the candidate attribute and service/product pair. The rating may then be transmitted to the dictionary builder.

Following RECEIVE RATING INPUT BY HUMAN OPERATOR 460, process 400 proceeds to operation 470 IF RATING EXCEEDS THRESHOLD, ADD CANDIDATE ATTRIBUTE AND SERVICE/PRODUCT PAIR TO ATTRIBUTE DICTIONARY. According to embodiments, the attribute suitability rating may be compared against a threshold to determine if the candidate attribute and service/product pair comprises a suitable attribute and service/product pair. In other embodiments, other criteria may be utilized to determine if the candidate attribute and service/product pair comprises a suitable attribute and service/product pair. In other embodiments, various decision trees may be followed to determine if the candidate attribute and service/product pair comprises a suitable attribute and service/product pair. In one embodiment, the human operator's determination is the single input used to determine if the candidate attribute and service/product pair comprises a suitable attribute and service/product pair.

According to one embodiment, entries in the attribute dictionary may be used to provide additional information regarding the relevant products, services, and/or attributes. For example, product pages in an e-commerce web site can be tagged with appropriate concepts according to known aliases, synonyms, hypernyms, and/or plurals of the product. As another example, the attribute dictionary may be used to assist with computerized language processing for a search engine in order to interpret a search query. As another example, the attribute dictionary may be used to assist with computerized language processing to interpret the content of an e-commerce web page in order to identify relevant attribute(s), product(s), and/or service(s).

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for extracting attributes, comprising:
   receiving a text passage from a data source;
   at an n-gram extractor, identifying n-grams in the text passage;
   at the n-gram extractor, selecting a candidate attribute and service/product pair from the n-grams in the text passage;
   at an attribute selector interface, transmitting the candidate attribute and service/product pair to a human operator;
   at the attribute selector interface, prompting the human operator to input an attribute suitability rating for the candidate attribute and service/product pair;
   at the attribute selector interface, receiving an input entered by the human operator, the input corresponding to the attribute suitability rating;
   at a dictionary builder, receiving the attribute suitability rating for the candidate attribute and service/product pair; and
   at the dictionary builder, if the attribute suitability rating exceeds a suitability threshold, adding the candidate attribute and service/product pair to an attribute dictionary.

2. The method of claim 1, wherein the data source comprises one selected from a group consisting of a product title, a category description, and a product description.

3. The method of claim 1, wherein the attribute suitability rating comprises a numerical score.

4. The method of claim 1, wherein the attribute suitability rating comprises a dichotomous rating.

5. The method of claim 1, further comprising analyzing the attribute dictionary to determine a canonical name for a product or a service of the candidate attribute and service/product pair.

6. The method of claim 1, further comprising analyzing a context portion of the text passage to determine a name variation of a product or a service of the candidate attribute and service/product pair.

7. The method of claim 1, wherein the candidate attribute and service/product pair comprises a high frequency n-gram.

8. The method of claim 1, further comprising at the dictionary builder, generating an ontological graph having nodes that represent products or services.

9. A computer system for extracting attributes comprising:
   an attribute extractor comprising a memory and a processing device, the memory storing computer-readable instructions directing the processing device to:
   receive a text passage from a data source;
   identify n-grams in the text passage;
   select a candidate attribute and service/product pair from the n-grams in the text passage;
   transmit the candidate attribute and service/product pair to a human operator interface;

receive an input entered by the human operator, the input corresponding to an attribute suitability rating for the candidate attribute and service/product pair; and if the attribute suitability rating exceeds a suitability threshold, add the candidate attribute and service/product pair to an attribute dictionary.

10. The computer system of claim 9, wherein the data source comprises one selected from a group consisting of a product title, a category description, and a product description.

11. The computer system of claim 9, wherein the attribute suitability rating comprises a numerical score.

12. The computer system of claim 9, wherein the attribute suitability rating comprises a dichotomous rating.

13. The computer system of claim 9, wherein the computer-readable instructions further direct the processing device to analyze the attribute dictionary to determine a canonical name for a product or a service of the candidate attribute and service/product pair.

14. The computer system of claim 9, wherein the computer-readable instructions further direct the processing device to analyze a context portion of the text passage to determine a name variation of a product or a service of the candidate attribute and service/product pair.

15. A computer system for extracting attributes comprising:

an n-gram extractor comprising an n-gram extractor memory and an n-gram extractor processing device, the n-gram extractor memory storing computer-readable instructions directing the n-gram extractor processing device to extract a candidate attribute and service/product pair from a text passage;

an attribute selector interface comprising an attribute selector interface memory and an attribute selector interface processing device, the attribute selector interface memory storing computer-readable instructions directing the attribute selector interface processing device to:

present an interface to a human operator and prompt the human operator to input an attribute suitability rating of the candidate attribute and service/product pair;

a dictionary builder comprising a dictionary builder memory and a dictionary builder processing device, the dictionary builder memory storing computer-readable instructions directing the dictionary builder processing device to:

receive the attribute suitability rating input by the human operator;

based on the attribute suitability rating, determine if the candidate attribute and service/product pair comprises an attribute and service/product pair; and if the candidate attribute and service/product pair comprises an attribute and service/product pair, add the candidate attribute and service/product pair to an attribute dictionary.

16. The computer system of claim 15, wherein the n-gram extractor memory stores computer-readable instructions further directing the n-gram extractor processing device to retrieve the text passage from a data source.

17. The computer system of claim 15, wherein if the candidate attribute and service/product pair comprises the attribute and service/product pair, the instructions further direct the dictionary builder to store metadata relating to the attribute and service/product pair, and wherein the metadata comprises:

a frequency of the attribute and service/product pair in a data source; and a ranking of each attribute and service/product pair from the human operator.

18. The computer system of claim 15, wherein the text passage is extracted from a data source comprising one selected from a group consisting of a product title, a category description, and a product description.

19. The computer system of claim 15, wherein the attribute suitability rating comprises a dichotomous rating.

20. The computer system of claim 15, further comprising an analyzer adapted to analyze the attribute dictionary to determine a canonical name for a product or a service of the attribute and service/product pair.

* * * * *